(12) United States Patent
Gerami-Manesch et al.

(10) Patent No.: US 8,807,583 B2
(45) Date of Patent: Aug. 19, 2014

(54) METHOD FOR CONTROLLING PRESSURE EQUALIZATION IN VEHICLE RUNNING GEAR

(75) Inventors: Bijan Gerami-Manesch, Burgdorf (DE); Johann Lucas, Sehnde (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 13/885,048

(22) PCT Filed: Oct. 21, 2011

(86) PCT No.: PCT/EP2011/005316
§ 371 (c)(1),
(2), (4) Date: May 13, 2013

(87) PCT Pub. No.: WO2012/072164
PCT Pub. Date: Jun. 7, 2012

(65) Prior Publication Data
US 2013/0228991 A1   Sep. 5, 2013

(30) Foreign Application Priority Data

Dec. 2, 2010   (DE) .......................... 10 2010 053 264

(51) Int. Cl.
*B60G 17/033* (2006.01)
*B60G 17/015* (2006.01)
*B60G 17/016* (2006.01)

(52) U.S. Cl.
CPC ...... *B60G 17/0155* (2013.01); *B60G 2800/214* (2013.01); *B60G 2800/93* (2013.01); *B60G 2300/0262* (2013.01); *B60G 2800/95* (2013.01); *B60G 2800/182* (2013.01); *B60G 2400/51222* (2013.01); *B60G 2202/152* (2013.01); *B60G 2800/18* (2013.01); *B60G 17/033* (2013.01); *B60G 17/0164* (2013.01)
USPC .................................................... 280/124.16

(58) Field of Classification Search
CPC .......... B60G 17/0155; B60G 17/0164; B60G 2300/0262; B60G 2800/93; B60G 2800/214; B60G 17/033; B60G 2202/152; B60G 2400/5122; B60G 2800/18; B60G 2800/182; B60G 2800/95
USPC .................................................... 280/124.16
See application file for complete search history.

(56) References Cited

U.S. PATENT DOCUMENTS

| 4,819,998 | A | * | 4/1989 | Goebels et al. | ............. 303/118.1 |
| 5,044,660 | A | * | 9/1991 | Yamamura et al. | .......... 280/5.52 |
| 5,236,250 | A | * | 8/1993 | Moody et al. | ..................... 303/7 |

(Continued)

FOREIGN PATENT DOCUMENTS

| DE | 34 30 454 A1 | 10/1985 |
| DE | 35 45 222 A1 | 6/1987 |

(Continued)

*Primary Examiner* — Paul N Dickson
*Assistant Examiner* — Timothy Wilhelm
(74) *Attorney, Agent, or Firm* — Kramer Levin Naftalis & Frankel LLP

(57) ABSTRACT

A method for controlling pressure equalization in running gear for a utility vehicle and having a drive axle and at least one trailing axle without drive function. The includes assigning each axle to a pressure chamber on the left-hand and right-hand sides of the vehicle. The pressure ratio of the pressure chambers between the drive axle and the trailing axle is set independently for the two sides of the vehicle as a function of detected signals.

11 Claims, 3 Drawing Sheets

(56) References Cited

U.S. PATENT DOCUMENTS

| | | | | |
|---|---|---|---|---|
| 5,339,611 | A | * | 8/1994 | Roderfeld et al. ......... 56/10.2 R |
| 5,500,798 | A | * | 3/1996 | Inagaki ........................ 701/37 |
| 6,276,710 | B1 | * | 8/2001 | Sutton .......................... 280/678 |
| 2003/0127819 | A1 | * | 7/2003 | Richardson ............ 280/124.157 |

FOREIGN PATENT DOCUMENTS

| | | |
|---|---|---|
| DE | 38 15 612 A1 | 11/1989 |
| DE | 38 41 476 A1 | 6/1990 |
| DE | 43 27 764 C2 | 2/1995 |
| DE | 195 30 260 C2 | 2/1997 |
| DE | 10 2006 011 183 A1 | 9/2007 |
| DE | 10 2007 033 527 A1 | 1/2009 |
| EP | 0 378 202 B1 | 7/1990 |
| EP | 1 063 107 A1 | 12/2000 |
| EP | 1 108 570 B1 | 6/2001 |

* cited by examiner

METHOD FOR CONTROLLING PRESSURE EQUALIZATION IN VEHICLE RUNNING GEAR

FIELD OF THE INVENTION

The present invention generally relates to a method for controlling the pressure compensation in a vehicle chassis having a drive axle and at least one trailing axle without a drive function, wherein each of the axles is assigned a pressure chamber on the left and right sides of the vehicle, by means of which the pressure acting on the respective axle is controlled.

BACKGROUND OF THE INVENTION

In vehicles, particularly commercial vehicles, the foremost of a plurality of rear axles is driven, while the rear axles are purely trailing or lift axles and as such exhibit no drive function.

When starting a vehicle of this kind, the drive wheels may spin due to a lack of static friction, since the movement of the vehicle body during starting inevitably causes an additional load on the trailing axle and also a removal of the load from the drive axle. If this removal of the load from the drive axle falls below a given limit, it causes the drive wheels to spin.

The air pressure required in the bellows springs of the pressure chambers of the axles results from the load situation. The air pressure is distributed between the main and the additional axle based on the traction control principle, wherein each of the two rear axles is given its own permissible maximum pneumatic suspension pressure value, which corresponds to a fully laden vehicle. The aim of the traction control is primarily to load the drive axle as the load increases, namely by venting the pneumatic spring bellows of the drive axle up to the maximum permissible pressure, while maintaining the vehicle level. If there is a further increase in load, this is then borne by the additional axle, wherein the pressure in the bellows of the drive axle is held at the maximum permissible pressure.

The pressure in the bellows of the trailing axle is thereby reduced to a minimum value specified by law. A relay control ensures that the resulting high pressure in the bellows of the drive axle occurs only for a limited period. Once this time limit has been reached, this control switches the bellows of the trailing axle back to normal working pressure again. This means that an overloading of the bellows of the drive axle— primarily when the vehicle is fully laden—is avoided.

A process for the traction control of a vehicle with pneumatic suspension having a drive axle and a lift axle is disclosed in DE 10 2006 011 183 A1. A measurement of the pneumatic spring pressures on both vehicle sides of the drive axle and the lift axle is used to determine whether there is an overload on a vehicle side which means that the maximum permissible pneumatic spring pressures are exceeded.

In the event that the maximum permissible bellows pressures at the drive axle and the lift axle are exceeded on at least one vehicle side due to an overloading of the vehicle, the system switches into an overload mode, in which it is no longer the traction but a pressure ratio between the drive and trailing axle that is compensated according to the permissible bellows pressures at the two axles.

In order to retain at least largely the traction existing at the drive axle during the transition from traction control to pressure ratio control in overload mode, the overload is not sweepingly detected for the entire vehicle, but when an overload is identified on only one side of the vehicle, only this overload side is initially controlled according to the pressure ratio control in overload mode and the other lighter vehicle side is left in traction control with an adjustment. Due to the side-based overload detection, an overload is avoided by transferring the pressure from the drive axle to the trailing axle.

DE 35 45 222 A1 discloses a device for the partial removal of pressure from the trailing axle of a vehicle with a pneumatic suspension, which enables differentiated control of the pressure in the bellows of the trailing axle, which is adapted to the entire vehicle load. For this purpose, the pressure in the bellows of the trailing axle is controlled by the pressure in the bellows of the drive axle by means of a specific pressure ratio valve. In this way, synchronization either of the two axles as a fixed pressure ratio between the axles or the left and right vehicle side, respectively, of both axles relative to one another as a fixed pressure ratio for both axles on the left and right side of the vehicle is proposed.

A process for controlling a compressed air-based vehicle suspension having a plurality of pneumatic spring elements disposed between at least one vehicle body and at least one vehicle axle is disclosed by DE 38 15 612 A1. In this case, an excessive pressure differential between pneumatic spring elements is identified by means of a control device and a pressure compensation control process is initiated. It is thereby possible for an excessive pressure difference between pneumatic spring elements, for example at a vehicle axle between the pneumatic spring elements of the left and right side of the vehicle, to be eliminated without the level of the vehicle body and the load distribution between the individual groups of pneumatic spring elements being changed in an inadmissibly excessive manner. A pressure deviation in the different pneumatic spring elements should thereby be avoided.

In addition, DE 38 41 476 A1 relates to a level control in a vehicle suspension for a right and a left vehicle side. In order to prevent a vehicle side from remaining above the level when the level drops, because the weight of the body is almost completely borne by the first pneumatic spring element or is taken over by another axle, for example, a control device ensures that there is venting on the vehicle side on which the level already lies within a tolerance range, in order to adjust the mean vehicle level to a permissible value.

SUMMARY OF THE INVENTION

Generally speaking, it is an object of the present invention to provide a process whereby the traction of a vehicle driven in this manner can be significantly improved. In particular, starting positions that are especially difficult in practice are to be made easier for the driver.

A process for controlling the pressure compensation in a chassis having a drive axle and at least one trailing axle without a drive function is therefore provided according to embodiments of the invention, wherein the axles are each assigned a pressure chamber on the left and right side of the vehicle, by means of which the pressure or the load on the respective axle is controlled, in which depending on the signals detected, the pressure ratio of the pressure chambers between the drive axle and at least one trailing axle is independently adjusted to change the load distribution for both sides of the vehicle. The pressure distribution in the pressure chambers, configured in practice as bellows springs, of the drive axle and also of the non-driven trailing axle is controlled in such a manner that a side-based traction control between the drive axle and the at least one trailing axle can be carried out depending on the signals. The signals particularly comprise the wheel speed of the wheels on the drive axle or control information, from which the slippage of all wheels on the drive axle and the trailing axle can be derived. On the basis of the signals detected for the driving condition, a side-based temporary load shift onto the drive axle is performed for a limited time. This process enables there to be significantly improved traction including, in particular, when there are t-split conditions, in which different friction values exist between the wheels and the road surface for the two sides of the vehicle. An individual pressure ratio can be set in this case, with the object of increasing the load on the drive axle for both sides of the vehicle independently to improve traction.

An altered weight distribution could of course also be achieved simply by relieving the load from the trailing axle. On the other hand, it is desirable if the load acting on the drive axle is increased on at least one vehicle side, due to the signals detected for the load or driving condition, so that an unwanted lowering of the trailing axle below a predetermined level can be avoided. Instead, the level is raised for a short time to improve traction, this also being advantageously accompanied by an increase in ground clearance.

According to an embodiment of the inventive process, the pressure in each pressure chamber is individually detected and independently adjusted by means of a pressure sensor assigned to the respective pressure chamber. A further improvement in traction is thereby achieved, in that an individual adjustment is realizable. Moreover, the pressure detected can be used in the pressure chamber both as an actuating element and also as an indicator for the load state. In addition, the pressure in a plurality of pressure chambers can be detected by means of a common pressure sensor through a suitable valve circuit.

A further embodiment is also achieved when the adjustment of the respective pressure ratio between the drive axle and the trailing axle occurs simultaneously on both sides of the vehicle. Unstable driving conditions are thereby reliably precluded, in that the optimum load distribution for the two vehicle sides for the driving situation concerned can be adjusted in a common process step. The driven wheels can thereby be reliably prevented from spinning, particularly in a μ-split starting situation.

An embodiment of the process in which the pressure in the respective pressure chambers is detected as a signal and/or a signal of an acceleration slip regulation is detected is particularly practical. In this way, the control information of existing systems already available can be advantageously used and taken into account accordingly when controlling the pressure distribution. Control information provided by acceleration slip regulation (ASR) or traction control (ATC Automatic Traction Control) is preferably suitable for this.

Furthermore, an adjustable inclination can also be advantageously used if, depending on the signals detected for the driving condition, a vehicle inclination is set against emerging centrifugal forces. By means of tilt technology of this kind, quicker cornering or an increase in comfort in the shape of a reduced sensation of lateral acceleration is achieved.

In another embodiment, a desired inclination or level change in the chassis between the drive axle and at least one trailing axle is set by the pressure ratio. It is thereby possible, for unloading purposes, for example, for a desired inclination of the body to be set temporarily, particularly when the vehicle is at a standstill. In this way, the inclination can be set in relation to the two vehicle sides and/or between the drive axle and the at least one trailing axle, so that an inclination between front and rear, an inclination between the left and right side of the vehicle or an overlaying of the two planes of inclination can be set. An inclination of this kind may, for example, make it easier for passengers to get into and out of vehicles used for passenger transportation in local public passenger transport due to the "kneeling" of the vehicle, i.e. the lowering of the vehicle on the entry side until the vehicle level on this side of the vehicle reaches a preset minimum. In commercial vehicles, an inclination of this kind can be used to increase the load condition temporarily, thereby influencing traction accordingly.

Furthermore, in order to avoid greater wear it is advantageous for the load increase to be limited until a maximum speed of 30 km/hr is reached or to a period of a few minutes, for example a maximum of 15 minutes, so that a removal of the load from the drive wheels is set once normal driving conditions have been achieved and an optimized load distribution for driving with little slippage can be resumed.

According to another embodiment, the load increase is held for a given time when the signals change. In this phase following the discontinuance of the increased traction requirement, which is also referred to as a "delay", the adjusted load distribution is initially kept constant and then, for example, steadily returned to the standard load distribution.

It should be understood that the process is not limited to the combination of a drive axle with a single trailing axle. Instead, a plurality of drive axles and/or trailing axles, one or a plurality of which may be configured as lift axles, may also be controlled according to the embodiments of the inventive process. In this case, according to a modification, the pressure ratio of the pressure chambers between different trailing axles can also be set independently, particularly for both vehicle sides.

In addition, the inventive process may also be used for road vehicles, particularly commercial vehicles, as well as for rail vehicles.

Still other objects and advantages of the present invention will in part be obvious and will in part be apparent from the specification.

The present invention accordingly comprises the several steps and the relation of one or more of such steps with respect to each of the others, and embodies features of construction, combinations of elements, and arrangement of parts adapted to effect such steps, all as exemplified in the detailed disclosure hereinafter set forth, and the scope of the invention will be indicated in the claims.

BRIEF DESCRIPTION OF THE DRAWINGS

The invention will be explained in greater detail hereinafter on the basis of the appended drawings of exemplary embodiments, in which.

DETAILED DESCRIPTION OF THE PREFERRED EMBODIMENTS

Figure 1:
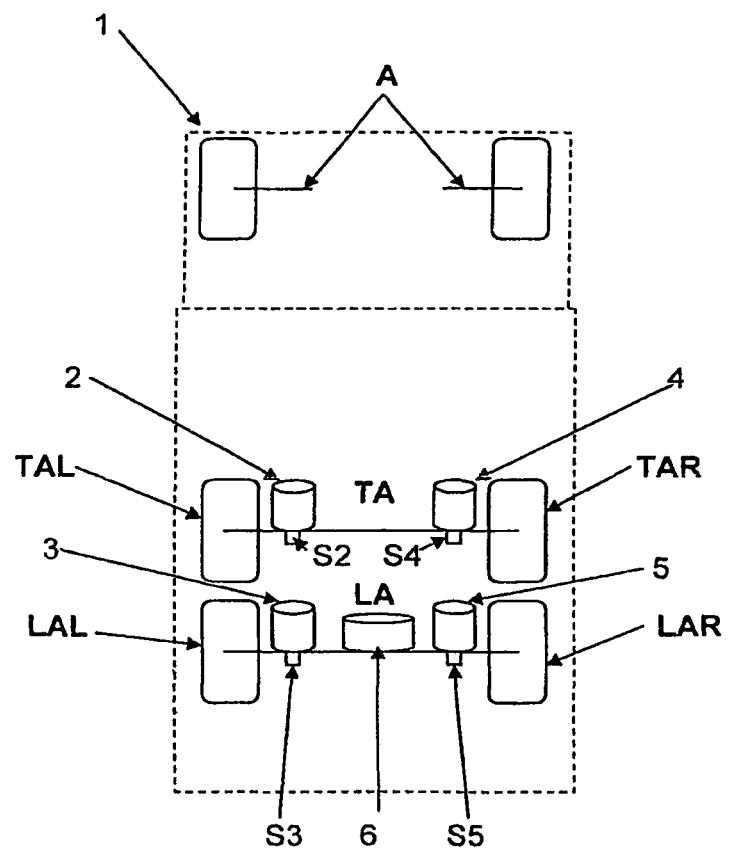
FIG. 1 is a schematic diagram of a vehicle intended for application of the process according to an embodiment of the present invention.
Figure 2A:
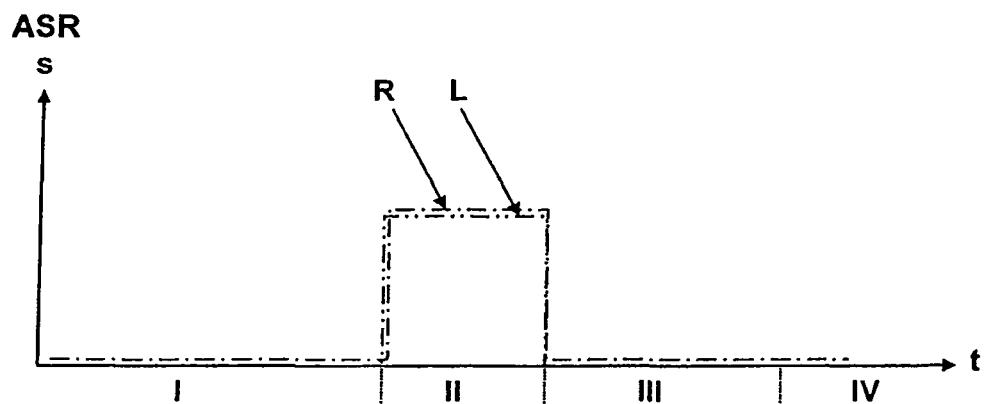
FIG. 2a is a diagram of a time pattern of a slip signal in accordance with an embodiment of the present invention.

FIG. 1 shows as a top view a schematic drawing of a chassis 1 intended for application of the process according to embodiments of the present invention, the chassis belonging to a vehicle not further illustrated having a steered front axle A and a drive axle TA and a non-driven trailing axle LA configured as a lift axle, which can be lifted by means of a lift bellows 6. Depending on the driving condition-dependent signals detected by sensors, a side-based traction control takes place on the basis of control information from which the slippage of the left wheel TAL and the right wheel TAR on the drive axle TA and also of the left wheel LAL and the right wheel LAR on the trailing axle LA is deduced. Based on these driving condition signals, the vehicle side of those wheels TAL, TAR, LAL, LAR that exhibits a greater slippage s, as depicted in FIG. 2a, is temporarily exposed to a greater load. This involves a load displacement from the trailing axle LA to the drive axle TA. For this purpose, the pressure in the pressure chambers 3 and 5 shown in FIG. 1 is therefore lowered and the pressure in the pressure chambers 2 and 4 is increased. Each of the pressure chambers 2, 3, 4 and 5 is assigned a separate pressure sensor S2, S3, S4 and S5 in each case for detecting and monitoring the respective pressure.

If the nature of the underlying surface causes such an increased slippage for one side of the vehicle, for example on wheels TAR and LAR on the right side of the vehicle, to be detected, the load displacement may also be limited to one side of the vehicle or to this side of the vehicle as opposed to the other side of the vehicle. For this purpose, the pressure of the pressure chamber 2 of the drive axle TA and the pressure chamber 3 of the trailing axle LA disposed on the left side of the vehicle is increased, for example, or the pressure of the pressure chamber 4 of the drive axle TA disposed on the right side of the vehicle and the pressure chamber 5 of the trailing axle LA is reduced. This enables significantly improved traction to be achieved, particularly in μ-split conditions. The first pressure chamber 2, the second pressure chamber 3, the third pressure chamber 4 and the fourth pressure chamber 5 and also the lift bellows 6 may be configured as height-adjustable pneumatic springs, particularly as rolling bellows pneumatic springs and/or folding bellows pneumatic springs.

Figure 2B:
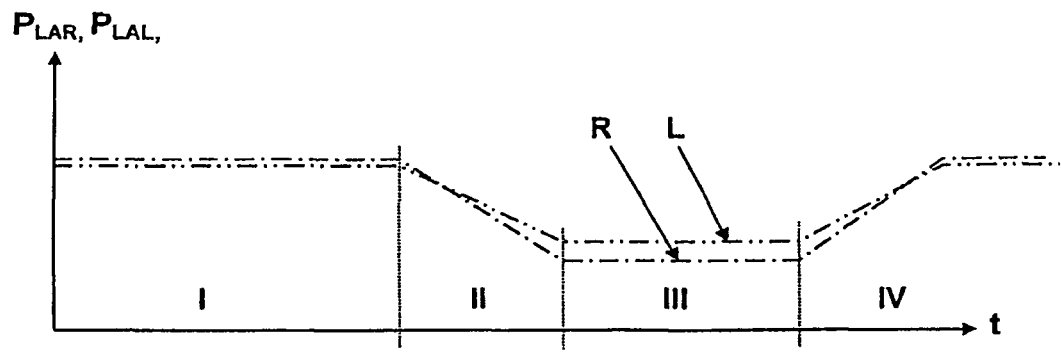
FIG. 2b is a diagram of a time pattern of the load set at the trailing axle in accordance with an embodiment of the present invention.
Figure 2C:
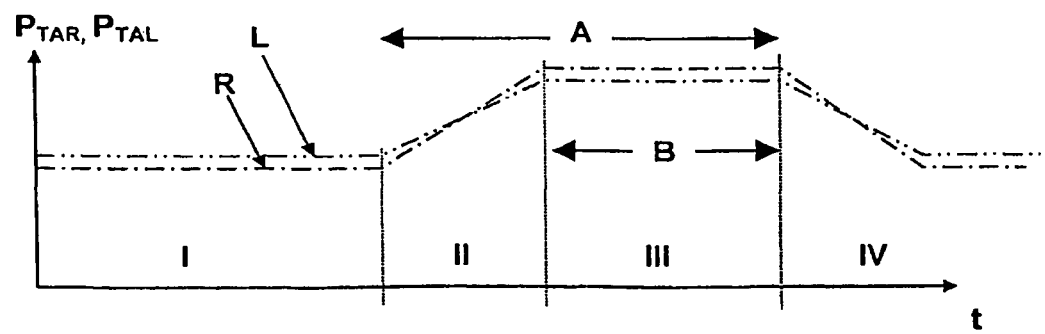
FIG. 2c is a diagram of a time pattern of the load set at the drive axle in accordance with an embodiment of the present invention.

The process according to an embodiment of the present invention is illustrated using FIGS. 2a to 2c, which each depict a corresponding time pattern separately for the right side of the vehicle R and the left side of the vehicle L. In FIG. 2a the course of an ASR signal reproducing the slippage s of the wheels TAL, TAR shown in FIG. 1 of the drive axle TA is initially depicted. Recognizable from the diagram is a negligible slippage s during the course of the first period of time I, the third period of time III and the fourth period of time IV, which is only interrupted by a rapidly increased slippage limited to the second period of time II.

The pressure $P_{LAL}$ in the pressure chamber 2 of the drive axle TA shown in FIG. 1 arranged on the left side of the vehicle and in the pressure chamber 3 of the trailing axle LA and the pressure $P_{LAR}$ in the pressure chamber 4 of the drive axle TA arranged on the right side of the vehicle and of the pressure chamber 5 of the trailing axle LA in the second period of time II, as is evident from FIGS. 2b and 2c, are reduced independently of the vehicle side, starting from a standard value in the first period of time I and in the fourth period of time IV due to the increased slippage detected in the second period of time II for the trailing axle LA and the pressure $P_{TAL}$ on the left side of the vehicle of the drive axle TA and also the pressure $P_{TAR}$ on the right side of the vehicle of the drive axle TA are simultaneously increased irrespective of the side. The pressure reached in each case $P_{LAL}$, $P_{LAR}$, $P_{TAL}$, $P_{TAR}$ at the end of the second period of time II is kept constant in the following third period of time III, irrespective of the already negligible slippage in this third period of time III, initially for a duration B, so that a stabilization of the power transmission is thereby carried out. The periods of time II, III and IV thereby define a load increase period A.

The deviations in the respective diagram courses of the left side of the vehicle compared with the right side of the vehicle L, R are depicted in FIGS. 2a to 2b solely by way of example. These may of course also differ to a significantly greater extent in practice. Furthermore, the first period of time I, the second period of time II, the third period of time III or the fourth period of time IV for the vehicle sides L, R may be measured differently. In addition, the respective courses of the left side of the vehicle L and the right side of the vehicle R may, conversely, coincide.

Figure 3:
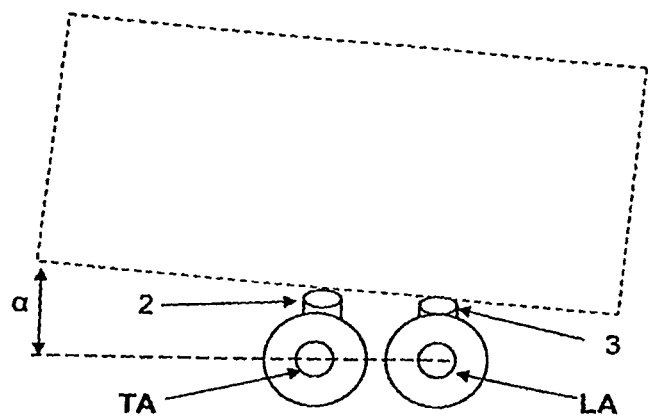
FIG. 3 is a schematic diagram of an inclination of the chassis of the drive axle in relation to the trailing axle in accordance with an embodiment of the present invention.

In FIG. 3 an inclination of the chassis of the drive axle TA in relation to the trailing axle LA is depicted using an angle α, wherein the inclination is illustrated in an exaggerated manner for ease of understanding. The angle α describes the inclination of the vehicle body in the longitudinal direction of the vehicle, for example of the base of the loading area, relative to a virtual plane, which is formed by the drive axle TA and the trailing axle LA or, expressed in simple terms, the inclination of the vehicle body in the longitudinal direction of the vehicle to the road surface, which is not shown, is described by the angle α. To adjust the inclination, the pressure in the pressure chamber 2 of the drive axle TA is increased and the pressure in the pressure chamber 3 of the trailing axle LA is lowered.

Figure 4:
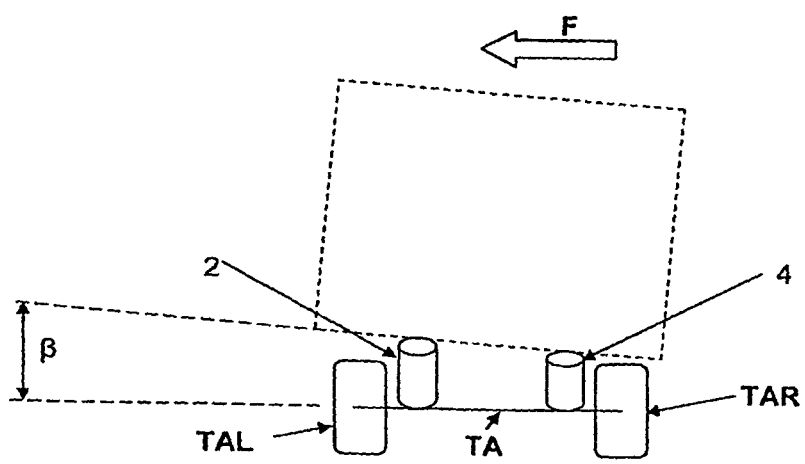
FIG. 4 is a schematic diagram of an inclination of the chassis on the left side of the vehicle in relation to the right side of the vehicle in accordance with an embodiment of the present invention.

Moreover, an inclination of the chassis on the left side of the vehicle in relation to the right side of the vehicle against the centrifugal forces F occurring during driving is illustrated in FIG. 4 with a likewise exaggerated drawing angle β. The angle β describes in the transverse direction of the vehicle the lateral inclination of the vehicle body, for example of the base of the loading area, relative to a virtual plane, which is formed by the drive axle TA and the trailing axle LA or, expressed in simple terms, the lateral inclination of the vehicle body to the road surface, which is not shown, is described by the angle β. As can be seen, the pressure chamber 2 of the left wheel TAL of the drive axle TA is exposed to a higher pressure than the pressure chamber 4 of the right wheel TAR of the drive axle TA for this purpose.

It will thus be seen that the objects set forth above, among those made apparent from the preceding description, are efficiently attained, and since certain changes may be made in the above processes and constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A method for controlling pressure compensation in a vehicle having (i) a drive axle and (ii) at least one trailing axle without a drive function, the method comprising:

to control pressure on the drive axle and the at least one trailing axle (a) assigning the drive axle to a first pressure chamber on a left side of the vehicle and to a second pressure chamber on a right side of the vehicle, and (b)

assigning the at least one trailing axle to a third pressure chamber on the left side of the vehicle and to a fourth pressure chamber on the right side of the vehicle;

receiving at least one of acceleration slip regulation control information and traction control information; and based on the at least one of acceleration slip regulation control information and traction control information, setting a first pressure ratio of the first pressure chamber assigned to the drive axle and the third pressure chamber assigned to the at least one trailing axle on the left side of the vehicle independently of a second pressure ratio of the second pressure chamber assigned to the drive axle and the fourth pressure chamber assigned to the at least one trailing axle on the right side of the vehicle.

2. The method as claimed in claim 1, further comprising increasing a load acting on the drive axle on at least one of the left side of the vehicle and the right side of the vehicle based on the acceleration slip regulation control information, the acceleration slip regulation control information including at least one of load and driving condition information.

3. The method as claimed in claim 1, further comprising independently detecting and independently adjusting pressure in each of the first, second, third and fourth pressure chambers using pressure sensors assigned to the respective first, second, third and fourth pressure chambers.

4. The method as claimed in claim 1, wherein setting the first pressure ratio and the second pressure ratio is effected substantially simultaneously.

5. The method as claimed in claim 1, further comprising receiving information representing pressure in at least one of the first, second, third and fourth pressure chambers; and wherein setting the first pressure ratio and the second pressure ratio is based on at least one of (i) the pressure in at least one of the first, second, third and fourth pressure chambers, and (ii) the at least one of acceleration slip regulation control information and traction control information.

6. The method as claimed in claim 2, further comprising setting an inclination of the vehicle against emerging centrifugal forces based on the acceleration slip regulation control information.

7. The method as claimed in claim 4, further comprising setting at least one of an inclination and level change in the vehicle between the drive axle and the at least one trailing axle.

8. A method for controlling pressure compensation in a vehicle having (i) a drive axle and (ii) at least one trailing axle without a drive function, the method comprising:

to control pressure on the drive axle and the at least one trailing axle (a) assigning the drive axle to a first pressure chamber on a left side of the vehicle and to a second pressure chamber on a right side of the vehicle, and (b) assigning the at least one trailing axle to a third pressure chamber on the left side of the vehicle and to a fourth pressure chamber on the right side of the vehicle;

receiving at least one of acceleration slip regulation control information and traction control information;

based on the at least one of acceleration slip regulation control information and traction control information, setting a first pressure ratio of the first pressure chamber assigned to the drive axle and the third pressure chamber assigned to the at least one trailing axle on the left side of the vehicle independently of a second pressure ratio of the second pressure chamber assigned to the drive axle and the fourth pressure chamber assigned to the at least one trailing axle on the right side of the vehicle; and increasing a load acting on the drive axle on at least one of the left side of the vehicle and the right side of the vehicle based on the acceleration slip regulation control information, the acceleration slip regulation control information including at least one of load and driving condition information, wherein increasing the load acting on the drive axle on at least one of the left side of the vehicle and the right side of the vehicle is limited in time to at least one of a predetermined load increase period and a maximum speed.

9. The method as claimed in claim 8, wherein the predetermined load increase period is no more than about fifteen minutes.

10. The method as claimed in claim 8, wherein the maximum speed is about thirty kilometers per hour.

11. A method for controlling pressure compensation in a vehicle having (i) a drive axle and (ii) at least one trailing axle without a drive function, the method comprising:

to control pressure on the drive axle and the at least one trailing axle (a) assigning the drive axle to a first pressure chamber on a left side of the vehicle and to a second pressure chamber on a right side of the vehicle, and (b) assigning the at least one trailing axle to a third pressure chamber on the left side of the vehicle and to a fourth pressure chamber on the right side of the vehicle;

receiving at least one of acceleration slip regulation control information and traction control information;

based on the at least one of acceleration slip regulation control information and traction control information, setting a first pressure ratio of the first pressure chamber assigned to the drive axle and the third pressure chamber assigned to the at least one trailing axle on the left side of the vehicle independently of a second pressure ratio of the second pressure chamber assigned to the drive axle and the fourth pressure chamber assigned to the at least one trailing axle on the right side of the vehicle; and retaining an altered pressure ratio of the first, second, third and fourth pressure chambers for a duration of a time period characterized by substantially negligible wheel slippage.

* * * * *

UNITED STATES PATENT AND TRADEMARK OFFICE
CERTIFICATE OF CORRECTION

| | | |
|---|---|---|
| PATENT NO. | : 8,807,583 B2 | Page 1 of 1 |
| APPLICATION NO. | : 13/885048 | |
| DATED | : August 19, 2014 | |
| INVENTOR(S) | : Gerami-Manesch et al. | |

It is certified that error appears in the above-identified patent and that said Letters Patent is hereby corrected as shown below:

Title Page, Item (57),

In the Abstract:

Line two should be corrected as follows:

gear for a utility vehicle having a drive axle and at least

Line three should be corrected as follows:

one trailing axle without drive function includes assign-

Signed and Sealed this
Twenty-fifth Day of November, 2014

Michelle K. Lee
*Deputy Director of the United States Patent and Trademark Office*